US005867774A

United States Patent [19]
Summers et al.

[11] Patent Number: 5,867,774
[45] Date of Patent: Feb. 2, 1999

[54] SMART REMOTE CONTROL PANEL FOR A RADIO

[75] Inventors: Mark D. Summers, Phoenix, Ariz.; Albert L. Nagele, Wilmette, Ill.; James D. Crowe, Chandler, Ariz.; Richard D. Spring, Cedar Rapids, Iowa

[73] Assignee: Motorola, Inc., Schaumburg, Ill.

[21] Appl. No.: 775,052

[22] Filed: Dec. 27, 1996

[51] Int. Cl.$^6$ ................................................ H04B 1/08
[52] U.S. Cl. .......................... 455/90; 455/348; 455/351; 455/352
[58] Field of Search .................................. 455/347, 346, 455/348, 349, 351, 352, 353, 354, 550, 556.9, 575, 90, 462, 103; 340/825.69, 825.72; 359/142–6, 148; 345/174

[56] References Cited

U.S. PATENT DOCUMENTS 4,728,949  3/1988  Platte et al. ................... 340/825.69 X
5,475,659  12/1995  Aoki ................................ 455/352 X
5,548,306  8/1996  Yates, IV et al. ...................... 345/174
5,581,599  12/1996  Tsuji et al. ........................ 455/462 X
5,610,946  3/1997  Tanaka et al. ...................... 455/103 X

*Primary Examiner*—Wellington Chin
*Assistant Examiner*—Philip J. Sobutka
*Attorney, Agent, or Firm*—Frank J. Bogacz

[57] ABSTRACT

A smart control panel (10) includes a processor (40) for remotely controlling a radio (20). The smart control panel (10) attaches and detached from the skirt (21) of the radio (20). The smart control panel (10) also includes a display screen (13) for inputting information from a user to the smart control panel (10) which is translated by the smart control panel (10) to operate the radio (20). A latching arrangement allow a handle (11) to lock the smart control panel (10) into the radio (20) when the units are in the attaches mode. A cable (30) or other RF links provide for coupling the units when they are in the detached mode.

18 Claims, 2 Drawing Sheets

SMART REMOTE CONTROL PANEL FOR A RADIO

BACKGROUND OF THE INVENTION

The present invention pertains to radios and more particularly to remote control of sophisticated radio operations.

Existing military and commercial radios typically include a myriad of controls for operating the radio.

Commercial radios usually have band selector switches, analog volume controls and frequency selection (tuning select) controls. These radios may include other controls for filtering, muting and other control functions. Some remote control of these functions has been achieved by infrared hand-held unit which typically provide remote control only for a limited number of the radio's functions and usually at a relatively short distance.

Military radios usually have a great amount of complexity associated with them and therefore require a great number of knobs, buttons and switches. All of the radio's functions need to be carefully and precisely controlled in military applications. Also as commercial radios become more complex, the same requirements apply to them. Current remote control devices mentioned above are limited in the amount of functions they can remotely control.

Accordingly what is needed is an apparatus for remotely controlling radios with complex control functions.

DESCRIPTION OF THE PREFERRED EMBODIMENT

Figure 1:
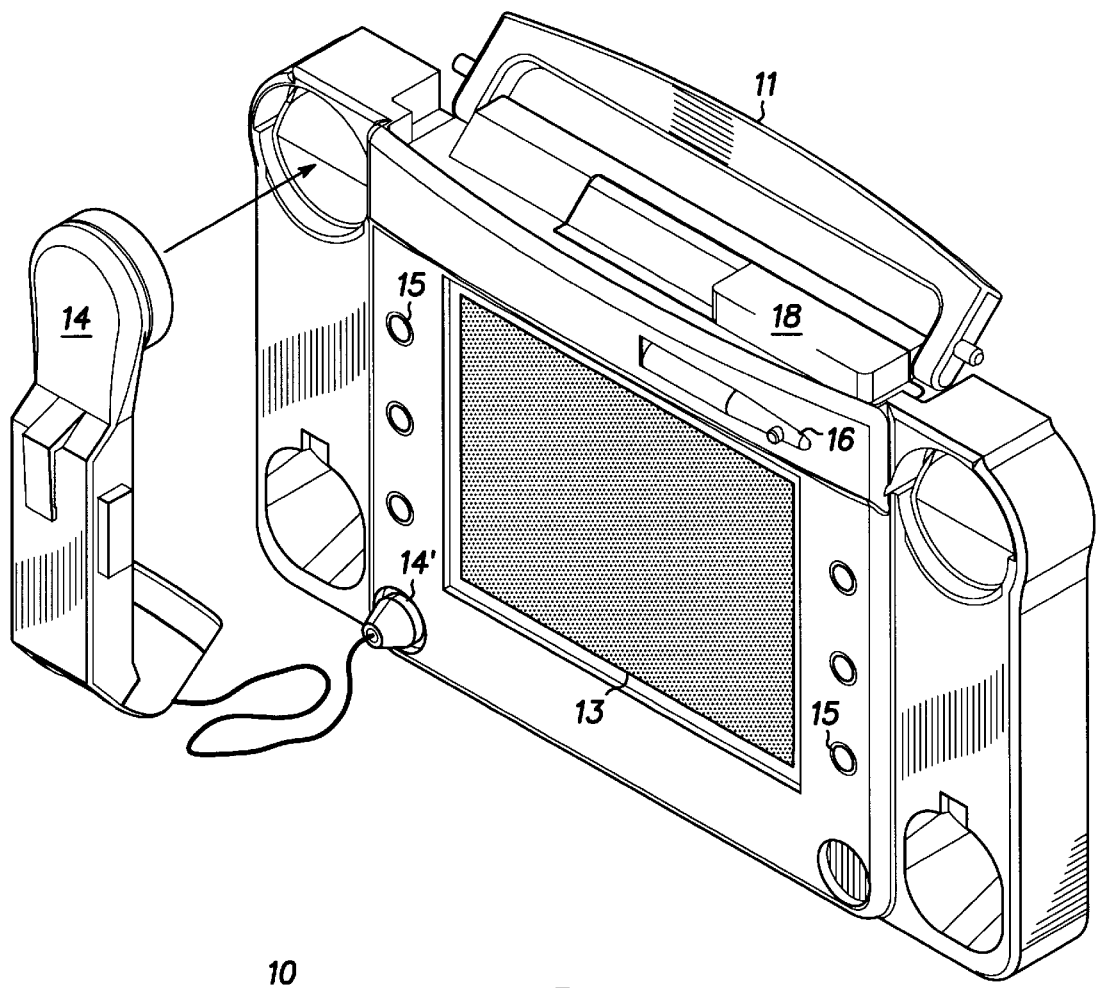
FIG. 1 is an perspective view of a smart control panel in accordance with the present invention.
Figure 2:
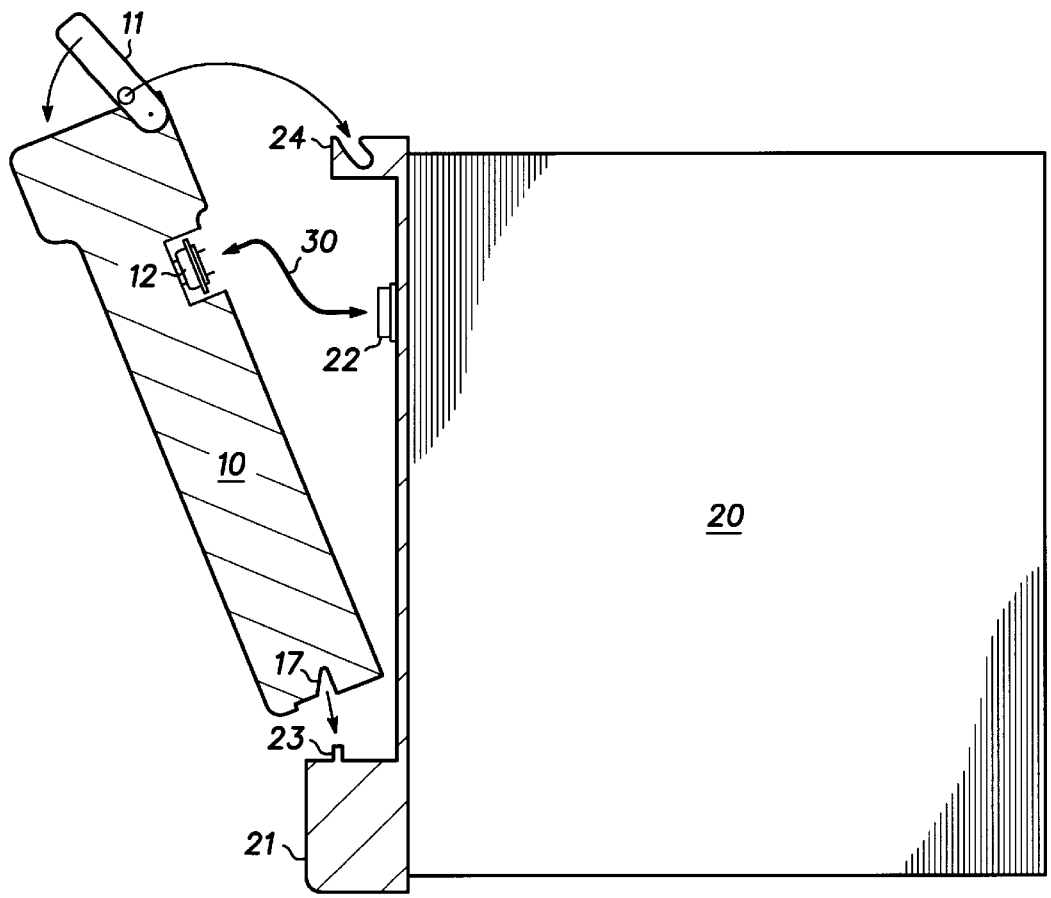
FIG. 2 is a side view of a smart control panel attaching or detaching to a radio in accordance with the present invention.

FIG. 1 is a perspective view of a smart control panel. Referring to FIGS. 1 and 2. The smart control panel 10 incorporates a display screen 13 based data entry arrangement. That is, a display of a keyboard interface is shown and is used to input data to the radio 20. This facility allows the operator to rapidly 'point and click' the desired commands that affect changes in the host unit. This kind of interface is therefore a more natural extension of the operator since he is not required to translate on-screen images into non-intuitive keystrokes on a keyboard or remember long sequences of keystrokes to bring a particular action into effect. The interface may be accomplished through a variety of technologies including an RF pen/digitizer combination, resistive touch screen or panel mounted ball mouse.

The smart control panel 10 supports 2 communication channels. Only one channel is shown and represented by telephone handset 14. These two channels are independent of one another. Handset 14 is connected to the smart control panel 10 via a wire connection to connector 14'. The two handset and channels can execute different communications waveforms simultaneously.

The smart control panel 10 includes a set of buttons 15 (hotkeys) along each side of the display screen 13 that can be programmed to perform a variety of functions through software. The buttons provide the operator rapid access to key functions of the device that are also available through slower procedures via the computer screen or keyboard The smart control panel 10 remotes digital control signals, analog voice signals and power over a single multiwire cable to control radio 20. The smart control panel 10 can be attached to the radio 20 by removing the umbilical cable 30. Such a smart control panel 10 is particularly useful for 2-way (receive and transmit) radios such as radio 20.

Handle 11 of smart control panel 10 allows for smart control panel 10 to be easily carried about and remotely control radio 20. Handle 11 also serves to lock smart control panel 10 into radio 20 when they are in the attached or mating positions. The attachment arrangement will be shown infra.

Smart control panel 10 also has a stylus 16 which is stored in the face of the panel 10. The stylus is used to input information to the smart control panel 10. Panel also provides access to a PCMCIA card slot 18. PCMCIA card slot is used to interface any PCMCIA compatible functions to the smart control panel 10. A user may use the stylus 16 to enter information to smart control panel 10.

FIG. 2 is a side view of a smart control panel 10 of FIG. 1. Radio 20 is shown to include a skirt 21 to which smart control panel 10 attaches and detaches from. Skirt 21 of radio 20 has a connector 22 which couples signals from the smart control panel 10 to radio 20. When the smart control panel 10 is attached to skirt 21 of radio 20, connector 22 mates with connector 12 of smart control panel 10 to transmit signals back and forth between the two units.

Connector 12 may be a floating, multi-pin connector (e.g. 36 pin) with guide pins to facilitate mating when the smart control panel 10 is attached to skirt 21. The mating connector 22 has holes corresponding to the guide pins of connector 12 to facilitate mating of the connectors 12 and 22 since attachment of the smart control panel 10 to skirt 21 is accomplished via a blind mating (or docking) process.

Smart control panel 10 has a groove 17 located along the bottom edge of the smart control panel 10. Groove 17 is for docking of the smart control panel 10 to the skirt 21 of radio 20 along the bottom edge of panel 10. Skirt 21 also includes a latch 24 proximate to the top edge of the skirt 21. Handle 11 of the smart control panel 10 latches (cams) into latch 24 for docking of the units.

Smart control panel 10 also includes guide teeth 23 along a lower horizontal surface of skirt 21. These teeth 23 are engaged to groove 17 for docking to the two units.

For the docking operation of panel 10 to skirt 21, the top of smart control panel 10 is rotated away from the skirt 21. Next, the groove 17 is engaged onto teeth 23 of the skirt 21. The top of the smart control panel 10 is then rotated toward the skirt 21 unit the connectors 12 and 22 mate with the aid of guiding pins and make electrical connection. This rotation is continued until handle 11 engages latch 24. Lastly, handle 11 is brought downward to a horizontal position where a caming action firmly latches the smart control panel 10 to skirt 21. The docking is complete and the radio 20 and smart control panel 10 now work as an integral unit.

For remote operation of the radio 20 by the smart control panel 10, panel 10 is detached from skirt 21 by reversing the process for attachment. That is, handle 11 is rotated upward. The top of panel 10 is rotated away from skirt 21 until connectors 12 ands 22 are detached. And panel 10 is lifted upward from teeth 23. Finally, cable 30 is connected between the connectors 12 and 22. The smart control panel 10 then remotely operates radio 20.

Although cable 30 is shown to couple panel 10 to skirt 21, other well know arrangement may be used for the transmission of signals between the two units. These arrangements include an RF link, an optical line-of-sight infrared coupling or an optical fiber cable.

Figure 3:
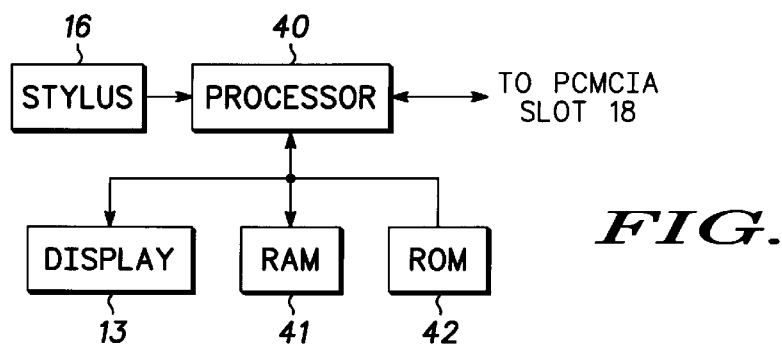
FIG. 3 is a block diagram of the control system for a smart control panel in accordance with the present invention.

Referring to FIG. 3, a block diagram of the processor arrangement for the smart control panel 10 is shown. The processor arrangement includes processor 40, random access memory (RAM) 41, and read only memory (ROM) 42. Processor 40 is coupled to ROM 42 for receiving and executing instruction for operating radio 20 to perform various waveforms. RAM 41 stores operating data for processor 40 and is also coupled to processor 40. Processor 40 is coupled to display 13. Processor 40 is also coupled to stylus 16 and to PCMCIA card slot 18. Stylus 16 operates with display screen 13 to provide input to processor 40. PCMCIA card slot interfaces PCMCIA compatible functions to processor 40 of the smart control panel 10.

Processor 40 can control and select a number of waveforms simultaneously and cause radio 20 to implement such waveforms. These waveforms can include for example AM (amplitude modulation), FM (frequency modulation), SINCGARS, and other waveforms as needed.

The smart control panel 10 which has been shown provides for remotely controlling radios with complex control functions. This is particularly useful for military radios which must support a number of complex waveforms and complex functions. The armed services have different radio communication waveforms. Therefore it is difficult for the army radios to communicate with the navy radios and with the air force radios, for example. Single radios which support such inter-service communication are large and complex. It is often times necessary to control such radios remotely, for example, when the vehicle housing the radio is under fire. The present invention provides for such a function. In addition, in commercial situation where it is desirable to remotely control all the functions of a complex radio, the present invention will meet those needs also.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A smart control panel for a radio comprising:
   said smart control panel being attached to said radio, said smart control panel for controlling the operation of said radio;
   a coupling for electrically coupling said smart control panel to said radio;
   said smart control panel being detachable from said radio such that said radio is remotely controlled by said smart control panel through said coupling;
   said smart control panel operates said radio to send and receive voice information and data information to and from said smart control panel; and
   a plurality of channel audio receiver/transmitters for transmitting and receiving said voice information from and to said radio to and from said smart control panel.

2. A smart control panel as claimed in claim 1, wherein said smart control panel further includes means for carrying said smart control panel when said smart control panel is detached from said radio.

3. A smart control panel as claimed in claim 1, wherein there is further included at least first and second connectors, said first connector attached to said smart control panel and said second connector attached to said radio, said first and second connectors being coupled by said coupling and said first and second connectors providing substantial support for said coupling when said smart control panel is detached from said radio.

4. A smart control panel as claimed in claim 1, wherein said coupling includes a wireline connection.

5. A smart control panel as claimed in claim 1, wherein said coupling includes an RF coupling.

6. A smart control panel as claimed in claim 1, wherein said coupling includes an optical line of sight infrared coupling.

7. A smart control panel as claimed in claim 1, wherein said coupling includes an optical cable coupling.

8. A smart control panel as claimed in claim 1, wherein said plurality of channel audio receiver/transmitters each include a telephone handset.

9. A smart control panel as claimed in claim 1, wherein said smart control panel includes a display screen operable when said smart control panel is attached to said radio and operable when said smart control panel is detached from said radio.

10. A smart control panel as claimed in claim 9, wherein said display screen includes a capacitive discharge display screen providing for input of a keyboard entry display.

11. A smart control panel as claimed in claim 1, wherein said smart control panel includes a processor for controlling the operation of said radio.

12. A smart control panel as claimed in claim 11, wherein said smart control panel further includes:
   random access memory (RAM) coupled to said processor; and
   read only memory (ROM) coupled to said processor for storing program instructions.

13. A smart control panel as claimed in claim 11, wherein said processor is coupled to a display screen and receives input from said display screen.

14. A smart control panel as claimed in claim 11, wherein said processor includes means for generating at least one waveform, said means for generating being controlled by said processor.

15. A smart control panel as claimed in claim 14, wherein said means for generating produces a plurality of waveforms simultaneously under control of said processor.

16. A smart control panel as claimed in claim 1, wherein there is further included at least one channel audio receiver/transmitter for sending and receiving said voice information to and from said radio from and to said smart control panel.

17. A smart control panel as claimed in claim 16, wherein said at least one channel audio receiver/transmitter includes a telephone handset.

18. A smart control panel for a radio comprising:
   said smart control panel being attached to said radio, said smart control panel for controlling the operation of said radio;
   a coupling for electrically coupling said smart control panel to said radio;
   said smart control panel being detachable from said radio such that said radio is remotely controlled by said smart control panel through said coupling;
   said smart control panel operates said radio to send and receive voice information and data information to and from said smart control panel;
   at least one channel audio receiver/transmitter for sending and receiving said voice information to and from said radio from and to said smart control panel;
   said at least one channel audio receiver/transmitter includes a telephone handset; and
   said telephone handset being detachable from said smart control panel for said telephone handset to operate through said detached smart control panel through said radio.

* * * * *

UNITED STATES PATENT AND TRADEMARK OFFICE
CERTIFICATE OF CORRECTION

PATENT NO. : 5,867,774
DATED : February 2, 1999
INVENTOR(S) : Mark D. Summers et al.

It is certified that error appears in the above-identified patent and that said Letters Patent is hereby corrected as shown below:

Please insert the following statement of government rights after the specification at column 1, line 3 of the above reference patent.

License Rights

This invention was made with Government Support under F30602-95-C-0026 awarded by the Air Force. The Government has certain rights in this invention.

Signed and Sealed this

Twenty-second Day of May, 2001

Attest:

NICHOLAS P. GODICI

Attesting Officer        Acting Director of the United States Patent and Trademark Office